US012066783B2

(12) United States Patent
Moteki et al.

(10) Patent No.: US 12,066,783 B2
(45) Date of Patent: Aug. 20, 2024

(54) IMAGE FORMING APPARATUS

(71) Applicant: CANON KABUSHIKI KAISHA, Tokyo (JP)

(72) Inventors: Junichi Moteki, Chiba (JP); Takuma Tadomi, Ibaraki (JP); Kohei Aoki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/980,640

(22) Filed: Nov. 4, 2022

(65) Prior Publication Data

US 2023/0152743 A1 May 18, 2023

(30) Foreign Application Priority Data

Nov. 12, 2021 (JP) ................................ 2021-184628

(51) Int. Cl.
*G03G 15/00* (2006.01)

(52) U.S. Cl.
CPC .................................... *G03G 15/70* (2013.01)

(58) Field of Classification Search
CPC ...................................................... G03G 15/70
See application file for complete search history.

(56) References Cited

U.S. PATENT DOCUMENTS 5,365,322 A * 11/1994 Hamada ............. G03G 15/6582 399/21
5,815,765 A * 9/1998 Park ....................... G03G 15/70 399/21
6,615,017 B2 * 9/2003 Tanaka ............... G03G 15/2028 399/323
2004/0218944 A1 * 11/2004 Kawaguchi .......... G03G 15/165 399/90
2007/0217839 A1 * 9/2007 Moteki .............. G03G 15/2028 399/329
2007/0223977 A1 * 9/2007 Matsubara ........... G03G 15/206 399/329
2015/0328903 A1 * 11/2015 Chanclón Fernández .................. B41J 11/006 242/410
2016/0274512 A1 * 9/2016 Nihei ................. G03G 15/2053
2018/0081314 A1 * 3/2018 Suzuki ............... G03G 15/5004
2018/0231931 A1 * 8/2018 Saito .................. G03G 15/2028
2019/0310570 A1 * 10/2019 Konno ............... G03G 21/0005
2020/0192263 A1 * 6/2020 Doda ..................... G03G 21/10
2020/0264818 A1 * 8/2020 Okuzumi ........... G03G 21/1892
2020/0272076 A1 * 8/2020 Sasaoka ............. G03G 15/2035

FOREIGN PATENT DOCUMENTS

JP 2007233372 A 9/2007

* cited by examiner

*Primary Examiner* — David H Banh
(74) *Attorney, Agent, or Firm* — ROSSI, KIMMS & McDOWELL LLP

(57) ABSTRACT

A contact member comes into contact with a back surface of a recording material between a nip portion and a transfer portion in a conveyance direction of the recording material. The contact member is capable of being located at a first position, a second position, and a third position. A detection unit detects a position of the contact member so that the detection unit can detect the first position, the second position, and the third position. The contact member reaches the third position by being biased by the recording material from the second position.

13 Claims, 11 Drawing Sheets

IMAGE FORMING APPARATUS

BACKGROUND OF THE INVENTION

Field of the Invention

The present invention relates to an image forming apparatus such as a copying machine, a printer, a facsimile, and a multifunction peripheral having a plurality of functions thereof.

Description of the Related Art

In an image forming apparatus, an image formed on an image bearing member such as a photosensitive drum or an intermediate transfer belt is transferred to a sheet in a transfer portion, the sheet to which the image has been transferred is conveyed to a fixing device, and the image is fixed to the sheet. At this time, a loop is formed on the sheet so that the sheet is not pulled between the transfer portion and the fixing device, and the loop is detected by a sensor to control the sheet conveyance speed of the transfer portion and the fixing device (see JP 2007-233372 A). In addition, JP 2007-233372 A discloses that a sheet remaining in a fixing device is detected by a loop sensor for detecting a loop.

As described above, in the case of the configuration described in JP 2007-233372 A, the loop detection unit also detects the residual sheet, but in order to detect the small-sized sheet, it is required to bring the contact portion of the loop detection unit, which is contact with the sheet, close to the inlet of the nip portion of the fixing device as much as possible. On the other hand, in the loop detection, since the deformation amount of the sheet is detected, it is required to bring the contact portion into contact with the sheet on the upstream of the position where the residual sheet detection is performed. In addition, when the residual sheet is detected by the loop detection unit, it is difficult to accurately detect the residual sheet.

SUMMARY OF THE INVENTION

The present invention provides a configuration capable of detecting a loop of a sheet and capable of improving detection accuracy of a sheet remaining in a fixing device.

According to one aspect of the present invention, an image forming apparatus includes a transfer portion configured to transfer a toner image onto a recording material, a first rotary member that is rotatable and includes a heat source, a second rotary member configured to form a nip portion by being in contact with an outer peripheral surface of the first rotary member, the second rotary member being configured to fix the toner image by applying heat and pressure while nipping and conveying the recording material together with the first rotary member, a contact member configured to come into contact with a back surface between the nip portion and the transfer portion in a conveyance direction of the recording material in a case where a surface of the recording material that comes into contact with the first rotary member is referred to a front surface and a surface of the recording material that comes into contact with the second rotary member is referred to the back surface when the recording material is nipped and conveyed by the nip portion, the contact member being capable of being located at a first position, a second position, and a third position, and, a detection unit configured to detect a position of the contact member so that the detection unit can detect the first position, the second position, and the third position. The first position is a position where the contact member is located in a case where the contact member is not in contact with the back surface. The second position and the third position are positions where the contact member is positioned in a case where the contact member comes into contact with the back surface. The contact member reaches the third position by being biased by the recording material from the second position.

Further features of the present invention will become apparent from the following description of exemplary embodiments with reference to the attached drawings.

DESCRIPTION OF THE EMBODIMENTS

First Embodiment

A first embodiment will be described with reference to FIGS. 1 to 6. First, a schematic configuration of an image forming apparatus according to the present embodiment will be described with reference to FIG. 1.

Image Forming Apparatus

The image forming apparatus 100 of the present embodiment is an electrophotographic tandem type full color printer including four image forming units Pa, Pb, Pc, and Pd each including photosensitive drums 3*a*, 3*b*, 3*c*, and 3*d* serving as photosensitive members. The image forming apparatus 100 forms a toner image on a sheet (recording material) according to an image signal from a document reading device (not illustrated) connected to an image forming apparatus main body 100A or a host device such as a personal computer communicably connected to the image forming apparatus main body 100A. Examples of the sheet include paper, a plastic film, and cloth. The image forming units Pa, Pb, Pc, and Pd form toner images of yellow, magenta, cyan, and black, respectively.

Note that the four image forming units Pa, Pb, Pc, and Pd included in the image forming apparatus 100 have substantially the same configuration except that the developed colors are different. Therefore, the image forming unit Pa will be described as a representative, and description of other image forming units will be omitted.

Figure 1:
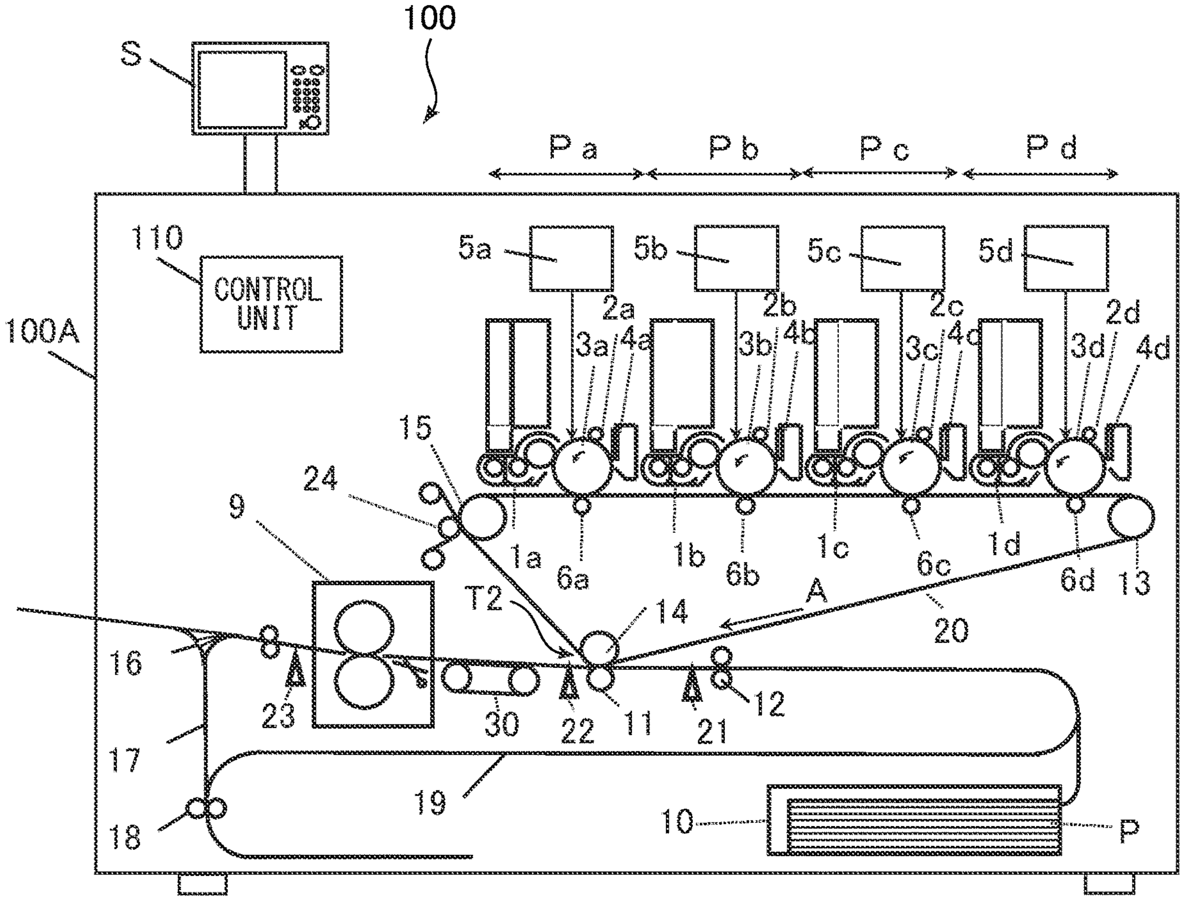
FIG. 1 is a schematic view of an image forming apparatus according to a first embodiment.

As illustrated in FIG. 1, a cylindrical photosensitive member, that is, a photosensitive drum 3*a* is disposed serving as an image bearing member in the image forming unit Pa. The photosensitive drum 3*a* is rotationally driven in an arrow direction in the drawing. A charging roller 2*a* serving as a charging unit, a developing unit 1*a*, a primary transfer roller 6*a* serving as a transfer member, and a cleaning device 4*a* serving as a cleaning unit are disposed around the photosensitive drum 3*a*. An exposing unit (laser scanner in the present embodiment) 5*a* serving as an exposure unit is disposed above the photosensitive drum 3*a* in the drawing.

An endless intermediate transfer belt 20 serving as an image bearing member that carries an image and an intermediate transfer member is disposed below each image forming unit in FIG. 1. The intermediate transfer belt 20 is stretched over the plurality of rollers 13, 14, and 15, and is configured to circulate (rotate) in a direction of an arrow A. Specifically, when the driving roller 13 is rotationally driven by a motor (not illustrated), the intermediate transfer belt 20 rotates. Then, the intermediate transfer belt 20 carries and conveys the toner image primarily transferred to the intermediate transfer belt 20 as described below. A secondary transfer outer roller 11 serving as a transfer member is disposed at a position facing a secondary transfer inner roller 14 with the intermediate transfer belt 20 interposed therebetween among the rollers stretching the intermediate transfer belt 20, and forms a secondary transfer portion T2 that transfers the toner image on the intermediate transfer belt 20 to the sheet P. That is, in the secondary transfer portion T2, the secondary transfer outer roller 11 conveys the sheet while nipping the sheet between the intermediate transfer belt 20, and transfers the toner image on the intermediate transfer belt 20 (on the image bearing member) to the sheet P. The fixing device 9 is disposed downstream of the secondary transfer portion T2 in a sheet conveyance direction.

A cassette 10 in which the sheet P is accommodated is disposed below the image forming apparatus 100. The sheet P fed from the cassette 10 is conveyed toward a registration roller 12 by a feed roller (not illustrated). Then, a leading edge of the sheet P abuts against the registration roller 12 in the stopped state, and a skew feeding of the sheet P is corrected by forming a loop. Thereafter, the registration roller 12 is started to rotate in synchronization with the toner image on the intermediate transfer belt 20, and the sheet P is conveyed to the secondary transfer portion T2.

A process of forming, for example, a four-color full-color image by the image forming apparatus 100 configured as described above will be described. First, when the image forming operation is started, a surface of the rotating photosensitive drum 3*a* is uniformly charged by the charging roller 2*a*. Next, the photosensitive drum 3*a* is exposed by a laser beam corresponding to an image signal emitted from the exposing unit 5*a*. As a result, an electrostatic latent image corresponding to the image signal is formed on the photosensitive drum 3*a*. The electrostatic latent image on the photosensitive drum 3*a* is visualized by toner as a developer stored in the developing unit 1*a*, and becomes a visible image.

The toner image formed on the photosensitive drum 3*a* is primarily transferred to the intermediate transfer belt 20 at a primary transfer portion formed between the photosensitive drum 3*a* and the primary transfer roller 6*a* disposed with the intermediate transfer belt 20 interposed therebetween. At this time, a primary transfer bias is applied to the primary transfer roller 6*a*. The toner (transfer residual toner) remaining on the surface of the photosensitive drum 3*a* after the primary transfer is removed by the cleaning device 4*a*.

Such an operation is sequentially performed in each of the yellow, magenta, cyan, and black image forming units, and toner images of four colors are superimposed on the intermediate transfer belt 20. Thereafter, the sheet P accommodated in the cassette 10 is conveyed to the secondary transfer portion T2 in accordance with the formation timing of the toner image. Then, by applying a secondary transfer bias to the secondary transfer outer roller 11, the toner images of the four colors on the intermediate transfer belt 20 are secondarily transferred collectively onto the sheet P. The toner remaining on the intermediate transfer belt 20 without being transferred in the secondary transfer portion T2 is removed by an intermediate transfer belt cleaner 24.

Next, the sheet P is conveyed to the fixing device 9 via a belt conveyance device 30. The belt conveyance device 30 is, for example, a conveyor belt that adsorbs and conveys the sheet P, and is disposed between the secondary transfer portion T2 and the fixing device 9. The belt conveyance device 30 is disposed to feed the sheet P discharged from the secondary transfer portion T2 to the fixing device 9 while assisting the conveying posture of the sheet P. In the present embodiment, the belt conveyance device 30 is formed of a belt stretched between rollers, but may have a configuration of only a guide member that guides the sheet P. The sheet P having passed through the secondary transfer portion T2 is delivered to the belt conveyance device 30, and is conveyed to the fixing device 9 by the belt conveyance device 30. The belt conveyance device 30 may be omitted, and the sheet P having passed through the secondary transfer portion T2 may be directly conveyed to the fixing device 9.

The fixing device 9 includes a fixing film 91 (first rotary member) and a pressure roller 92 (second rotary member) serving as a pair of rotary members, and a fixing nip portion is formed by the fixing film 91 and the pressure roller 92. The sheet P to which the toner image has been transferred is caused to pass through the fixing nip portion of the fixing device 9, whereby the sheet P is heated and pressurized. Then, the toner on the sheet is melted and mixed, and fixed to the sheet P as a full-color image. Thereafter, the sheet P is discharged to the outside of the apparatus by a discharge roller.

On the other hand, in a case where images are formed on both sides of the sheet P (double-sided printing), the sheet P is switched back to a switchback conveyance path 17 by switching a switching member 16, and the sheet P is conveyed to a duplex conveyance path 19 by a conveyance roller 18. The sheet P is conveyed from the duplex conveyance path 19 to the registration roller 12 in a state where the front and back sides of the sheet are reversed, and a toner image is formed on the back surface of the sheet P as described above. As a result, a series of image forming processes ends.

Note that the image forming apparatus 100 according to the present embodiment can also form a monochrome or multicolor image using an image forming unit for a desired monochrome or some of four colors, such as a black monochrome image.

In addition, the image forming apparatus 100 is provided with an operation panel S serving as an operation unit, and the operation panel S includes various buttons and operation switches operated by a user, and a display unit that displays a message to the user, an error such as occurrence of a jam, and the like. The image forming apparatus 100 includes a plurality of sheet detection sensors capable of detecting a sheet. Among these sheet detection sensors, a post-registration sensor 21 is a sensor for detecting that the leading edge of the sheet P having passed through the registration roller 12 has reached. A post-secondary transfer sensor 22 is a sensor for detecting that the leading edge of the sheet P has passed through the secondary transfer portion T2. A discharge sensor 23 is a sensor for detecting the sheet P on the side of the fixing device 9 from which the sheet P is discharged.

Signals from these sensors are transmitted to a control unit 110. The control unit 110 receives signals of various sensors including these sheet detection sensors and controls each unit. In addition, the entire image forming apparatus 100 is controlled according to input job information such as the number of sheets on which an image is formed and the type of the sheet P, and an image is formed. Such a control unit 110 includes a central processing unit (CPU), a read only memory (ROM), and a random access memory (RAM). The CPU controls each unit while reading a program corresponding to the control procedure stored in the ROM. In addition, work data and input data are stored in the RAM, and the CPU performs control with reference to data stored in the RAM on the basis of the above-described program or the like.

Fixing Device

Figure 2:
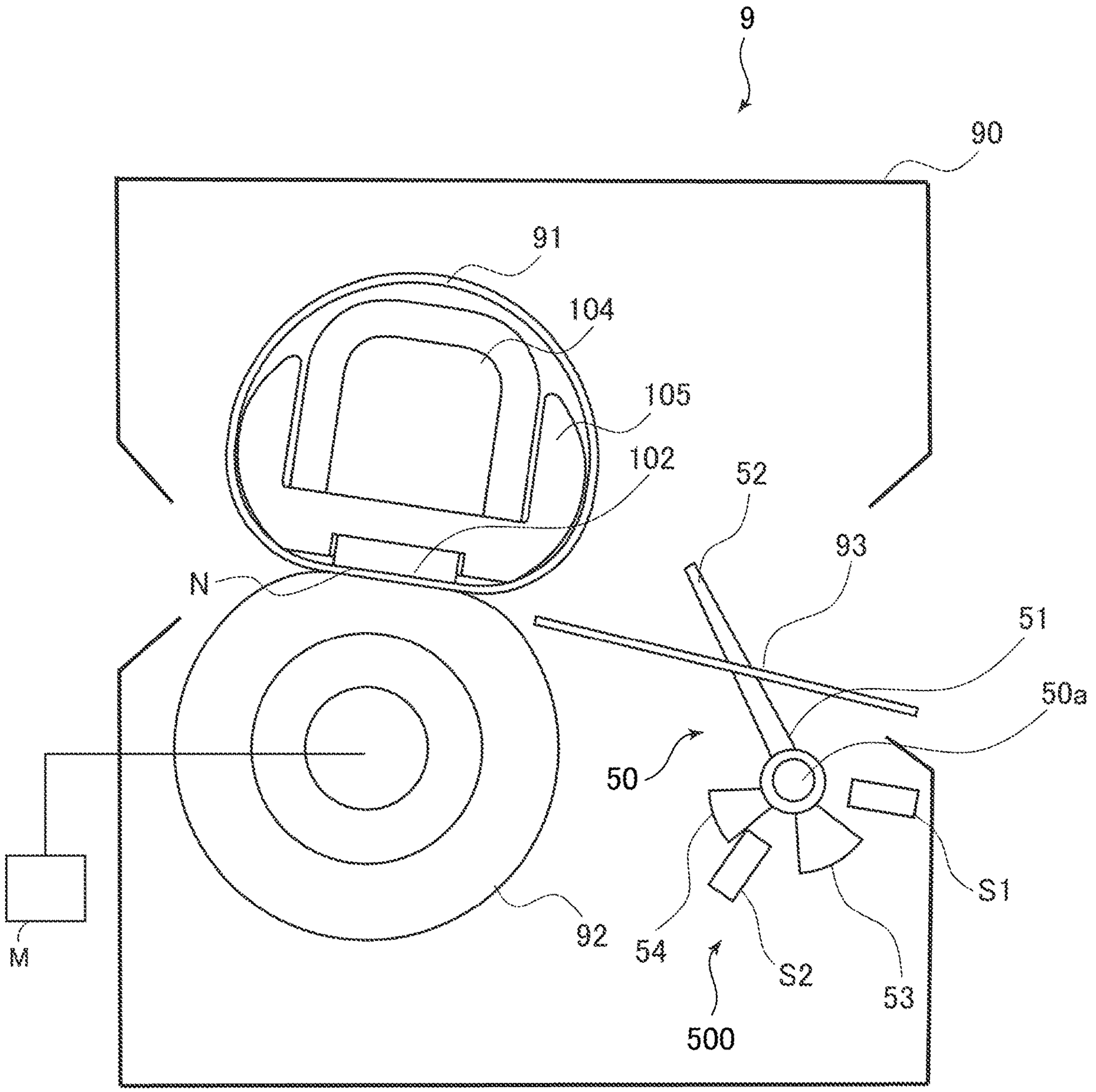
FIG. 2 is a schematic configuration cross-sectional view of a fixing device according to the first embodiment.

Details of the fixing device 9 will be described with reference to FIG. 2. The fixing device 9 includes the fixing film 91 serving as a fixing member and the pressure roller 92 serving as a pressure member. A heating member 102 for heating is disposed inside the fixing film 91 to heat the fixing film 91 to a predetermined temperature. In the fixing film 91, a stay 104 is disposed so as to penetrate, and a support member 105 supporting the heating member 102 is biased toward the pressure roller 92 by an urging member such as a spring (not illustrated) via the stay 104. Thus, a fixing nip portion N for nipping and conveying the sheet P is formed between the fixing film 91 and the pressure roller 92.

The heating member 102 is, for example, a plate-shaped ceramic heater, and is disposed at the fixing nip portion N. That is, the heating member 102 is supported by the support member 105 so as to face the pressure roller 92 via the fixing film 91. Further, the fixing film 91 rotates following the pressure roller 92 as the pressure roller 92 is rotationally driven. The fixing film 91 and the pressure roller 92 are disposed inside a casing 90.

That is, the fixing device 9 includes a casing 90, the fixing film 91 and the pressure roller 92 serving as a pair of rotary members disposed inside the casing 90, an inlet guide 93, and a sheet detection unit 50. In the casing 90, an inlet and an outlet of the sheet P are opened, and the fixing film 91, the pressure roller 92, the inlet guide 93, and the sheet detection unit 50 are disposed therein. The inlet guide 93 is disposed between the inlet of the casing 90 and the fixing nip portion N, and guides the sheet P enters from the inlet of the casing 90 and bearing the unfixed toner image to the inlet of the fixing nip portion N. The sheet P guided along the inlet guide 93 is heated and pressurized while being nipped and conveyed by the fixing film 91 and the pressure roller 92 at the fixing nip portion N. As a result, the toner image is fixed to the sheet P. The sheet detection unit 50 serves as both a loop detection sensor that detects that a loop is formed on the sheet P and a residual sheet detection sensor that detects that a sheet remains in the fixing device 9. A detailed description will be described below.

A fixing motor M capable of changing a rotational speed is attached to the fixing device 9, and the pressure roller 92 is rotationally driven by the fixing motor M. The control unit 110 can control the conveyance speed of the sheet P at the fixing nip portion N by controlling the rotational speed of the fixing motor M. In the fixing device 9 of the present embodiment, the pair of rotary members forming the fixing nip portion N is configured by the fixing film 91 and the pressure roller 92, but the configuration of the pair of rotary members is not limited thereto. For example, both of the pair of rotary members may be rollers, or both may be endless belts stretched by a plurality of rollers. Furthermore, one may be an endless belt, and the other may be a roller. The heating method is not limited to the ceramic heater described above, and for example, a halogen heater may be disposed in a roller, or an electromagnetic induction heating (IH) may be used.

Sheet Detection Unit

Next, a configuration of the sheet detection unit 50 will be described with reference to FIG. 2. The sheet detection unit 50 is disposed between the secondary transfer portion T2, the fixing film 91, and the pressure roller 92, and can detect a sheet. Specifically, the sheet detection unit 50 is disposed between the belt conveyance device 30 serving as a pre-fixing conveyance unit and the fixing nip portion N. The sheet detection unit 50 includes a flag 51 serving as a moving member and a swing member, and a detection unit 500 that detects the position of the flag 51. The flag 51 moves in contact with the sheet. In the present embodiment, the flag 51 is a swing member that can swing about a rotation shaft 50*a* serving as a swing center. The detection unit 500 includes a residual sheet detection sensor S2 serving as a first sensor and a loop detection sensor S1 serving as a second sensor.

The flag 51 serving as a contact member includes a contact portion 52 that can come into contact with the sheet, a first flag portion 53, and a second flag portion 54. The contact portion 52 is disposed such that a distal end portion is located on the fixing nip portion N side (nip portion side) with respect to the swing center, and is biased in a direction opposite to a pressing direction by the sheet P by a spring (not illustrated). When the sheet P is nipped and conveyed by the fixing nip portion N, in a case where a surface of the sheet P in contact with the fixing film 91 is referred to a front surface and a surface of the sheet P in contact with the pressure roller 92 is referred to a back surface, the contact portion 52 of the flag 51 is in contact with the back surface of the sheet P between the fixing nip portion N and the secondary transfer portion T2 in the conveyance direction of the sheet P. Specifically, the sheet detection unit 50 is disposed below the inlet guide 93. The inlet guide 93 is, for example, a plate-like member having an opening or a notch through which the flag 51 can pass, and the contact portion 52 protrudes upward from the opening or the notch. When the contact portion 52 comes into contact with the sheet P conveyed from the belt conveyance device 30, the contact portion 52 is pressed downward by the sheet P, so that the contact portion rotates in a counterclockwise direction in FIG. 2 around the rotation shaft 50*a*. The spring (not illustrated) biases the contact portion 52 to rotate in a clockwise direction in FIG. 2.

The flag 51 as described above can be located at a first position, a second position, and a third position. The first position is a position where the flag 51 is located when the flag 51 is not in contact with the back surface of the sheet P. The second position and the third position are positions where the flag 51 is located when the flag 51 comes into contact with the back surface of the sheet P. The flag 51 reaches the third position by being biased to the sheet P from the second position. Specifically, the first flag portion 53 and the second flag portion 54 are provided so as to protrude from the rotation shaft 50*a* at positions different from the contact portion 52, and can swing about the rotation shaft 50*a* together with the contact portion 52. The first flag portion 53 and the second flag portion 54 are arranged at positions having different phases in a rotation direction around the rotation shaft 50*a*, and the contact portion 52, the first flag portion 53, and the second flag portion 54 swing around the rotation shaft 50*a* while maintaining their phase positions. The first flag portion 53 is provided at a position where the loop detection sensor S1 can detect, and the second flag portion 54 is provided at a position where the residual sheet detection sensor S2 can detect.

When the flag 51 moves to the third position, the loop detection sensor S1 detects that the sheet conveyed by the secondary transfer portion T2, the fixing film 91, and the pressure roller 92 forms a loop. The residual sheet detection sensor S2 detects that a sheet remains in the fixing device 9 when the flag 51 moves to the second position different from the third position. Each of the loop detection sensor S1 and the residual sheet detection sensor S2 is a photo-interrupter in which a light emitting portion and a light receiving portion are arranged to face each other. That is, the light emitted from the light-emitting portion is shielded by the flag, so that rotation positions of the first flag portion 53 and the second flag portion 54 can be detected. Signals detected by the loop detection sensor S1 and the residual sheet detection sensor S2 are sent to the control unit 110, and the control unit 110 performs control as described below based on the received signals.

Loop Detection and Residual Sheet Detection

Figure 3:
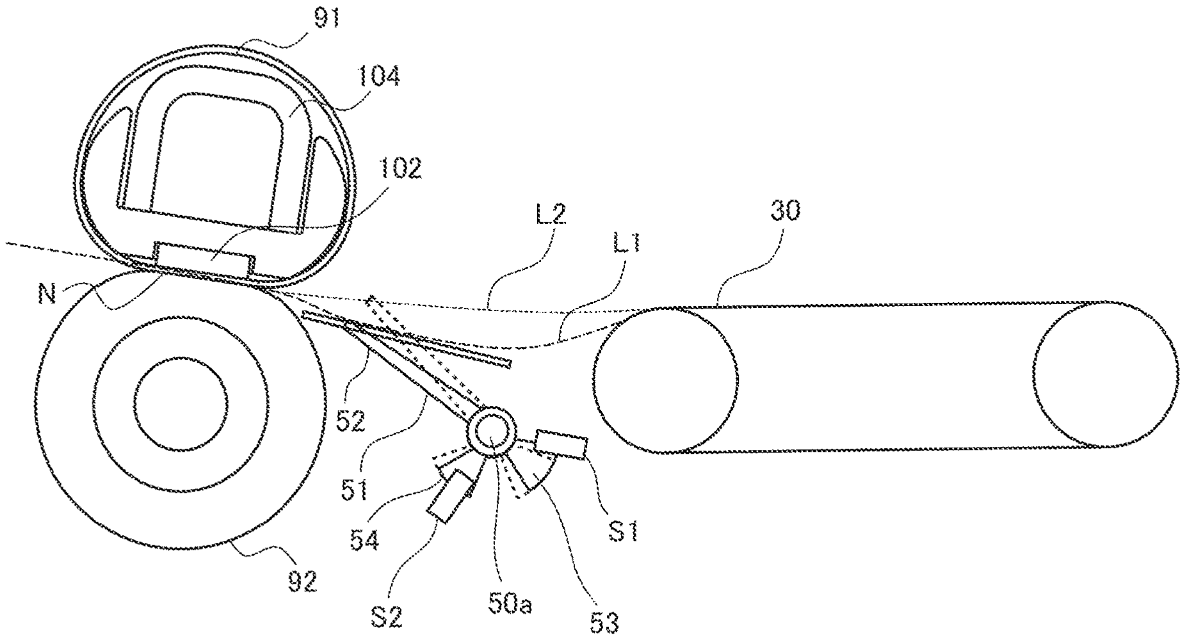
FIG. 3 is a diagram illustrating a loop detection state of a sheet according to the first embodiment.

Next, loop detection and residual sheet detection in the present embodiment will be described with reference to FIGS. 3 and 4. FIG. 3 illustrates a state in which the loop detection is performed by the sheet detection unit 50. FIG. 3 illustrates a state L1 in which a loop is generated in the sheet P due to a difference in sheet conveyance speed between the belt conveyance device 30 and the fixing device 9 and a state L2 in which the loop is eliminated. The belt conveyance device 30 is designed to convey a sheet at substantially the same speed as a sheet conveyance speed in the secondary transfer portion T2. Similarly, a sheet conveyance speed in the fixing device 9 is designed to convey the sheet at substantially the same speed. However, in the fixing device 9, when the pressure roller 92 is rotationally driven, the fixing film 91 is driven to rotate. The fixing film 91 rotates following the rotational drive of the pressure roller 92. Then, a slight slip occurs between the pressure roller 92 and the fixing film 91. As a result, an error occurs in the rotational speed of the belt. The same applies to the belt conveyance device 30. Therefore, there is a possibility that the sheet conveyance speed in the fixing device 9 and the sheet conveyance speed in the secondary transfer portion T2 are different. Therefore, when the sheet conveyance speed in the fixing device 9 is lower than the sheet conveyance speed in the belt conveyance device 30, a loop in which the sheet is bent occurs between the fixing device 9 and the belt conveyance device 30, and the sheet is not pulled between the fixing device 9 and the secondary transfer portion T2. On the other hand, when the sheet conveyance speed in the fixing device 9 is faster than the sheet conveyance speed in the belt conveyance device 30 in a state where the loop is not formed, there is a possibility that the sheet is pulled between the fixing device 9 and the secondary transfer portion T2 and a misalignment occurs in the transferred image in the secondary transfer portion T2.

Therefore, in the present embodiment, the loop detection sensor S1 is disposed so that the first flag portion 53 can be detected when the sheet P loops. That is, in a state (broken line) where the contact portion 52 of the flag 51 is in contact with the sheet P in the state L2, the first flag portion 53 does not shield the loop detection sensor S1. On the other hand, when the contact portion 52 comes into contact with the sheet P in the state L1 to swing in the counterclockwise direction and is located at the third position (solid line), the first flag portion 53 shields the loop detection sensor S1 (turns on the sensor).

In FIG. 3, when the flag 51 is located at the third position (solid line), the second flag portion 54 shields the residual sheet detection sensor S2 (turns on the sensor). Therefore, when both the loop detection sensor S1 and the residual sheet detection sensor S2 are turned on, the control unit 110 determines that a loop of the sheet P is formed between the belt conveyance device 30 and the fixing nip portion N. The positions of the second flag portion 54 and the residual sheet detection sensor S2 may be set such that the residual sheet detection sensor S2 is not turned on in this state.

Figure 4:
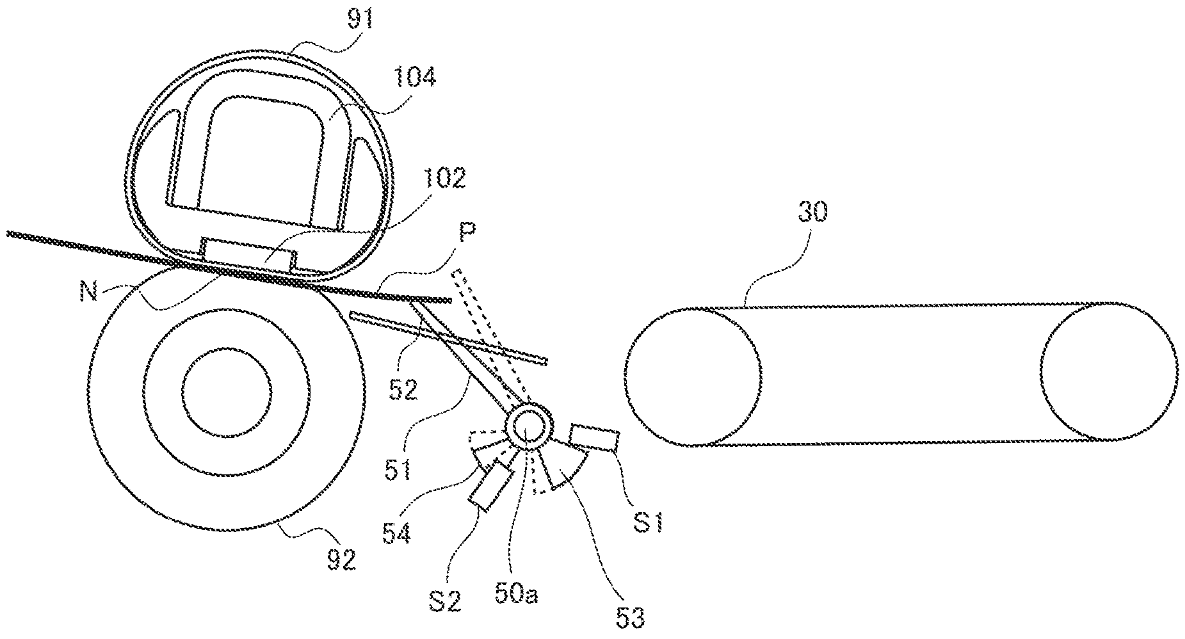
FIG. 4 is a diagram illustrating a residual detection state of a sheet according to the first embodiment.

FIG. 4 illustrates a state in which the residual sheet detection is performed by the sheet detection unit 50. In a case where the sheet P remains in the fixing nip portion N at the time of the jam, the contact portion 52 of the flag 51 comes into contact with the trailing edge of the remaining sheet P, and thus, in a case where the flag 51 rotates in the counterclockwise direction and is located at the second position (solid line), the second flag portion 54 shields the residual sheet detection sensor S2 (sensor is turned on). At this time, the first flag portion 53 does not shield the loop detection sensor S1. Therefore, the control unit 110 determines that the loop detection sensor S1 is turned off, the residual sheet detection sensor S2 is turned on, and the sheet remains in the fixing nip portion N. A broken line indicates a state in which the contact portion 52 of the flag 51 does not detect the sheet P. That is, the position of the broken line in FIG. 4 indicates the first position.

In a case where the sheet remains in the fixing nip portion N as described above, if the fixing device 9 is heated without detecting the residual sheet, the toner melts at the fixing nip portion N, and the residual sheet sticks to the fixing film 91, which may cause malfunction of the fixing device 9. For this reason, the sheet remaining in the fixing nip portion is generally detected by a sensor disposed on the conveyance path of the fixing device. Then, as the sensor arranged in front (upstream) of the fixing nip portion and the sensor arranged in rear (downstream) of the fixing nip portion are closer to the fixing nip portion, it is possible to detect the residual of the sheet having a shorter length in the conveyance direction.

Therefore, as in the present embodiment, in a case where the sheet detection unit 50 performs both the loop detection of the sheet and the residual sheet detection of the fixing nip portion, the flag 51 is preferably arranged at a position as close as possible to the fixing nip portion N. If the distal end of the contact portion 52 of the flag 51 is disposed at a position close to the inlet of the fixing nip portion N, even when a sheet having a short length in the conveyance direction remains in the fixing nip portion N, the residual sheet can be easily detected.

Therefore, in the present embodiment, the loop detection sensor S1 is disposed so as to be able to detect that the sheet forms a loop when the flag 51 moves to the third position, and the residual sheet detection sensor S2 is disposed so as to be able to detect that the sheet remains in the fixing device 9 when the flag 51 moves to the second position different from the third position. Therefore, the loop detection and the residual sheet detection can be performed in a state where the flag 51 is at a position suitable for the residual sheet detection and a position suitable for the loop detection, respectively. Therefore, it is possible to improve the accuracy of the detection of the loop of the sheet and the detection of the sheet remaining in the fixing device by one flag 51 without increasing the number of components.

Further, in the present embodiment, the sheet detection unit 50, that is, the flag 51 and the detection unit 500 are detachable integrally with the fixing device 9 with respect to the image forming apparatus main body 100A. Further, the sheet detection unit 50 is disposed inside the casing 90 of the fixing device 9. Specifically, the rotation shaft 50*a* of the flag 51 is supported directly on a frame of the fixing device 9 or on the inlet guide 93 provided on the frame. The fixing film 91 and the pressure roller 92 are also supported by the frame.

By making the sheet detection unit 50 detachable integrally with the fixing device 9 in this manner, the contact portion 52 of the flag 51 can be easily brought close to the fixing nip portion N. That is, in a case where the sheet detection unit 50 and the fixing device 9 are configured to be separately attachable to and detachable from the image forming apparatus main body 100A, a plurality of components are interposed between a support portion of the flag 51 with the contact portion 52 and a support portion of the fixing film 91 and the pressure roller 92. Therefore, it is necessary to define the positional relationship between the contact portion 52, the fixing film 91, and the pressure roller 92 in consideration of the tolerance of the plurality of components, and it is difficult to bring the contact portion 52 close to the fixing nip portion N.

On the other hand, by making the sheet detection unit 50 detachable integrally with the fixing device 9 as in the present embodiment, it is possible to reduce the number of components existing between the support portion with the contact portion 52 of the flag 51 and the support portion of the fixing film 91 and the pressure roller 92. Therefore, the number of parts considering tolerance is reduced, and the contact portion 52 can be easily brought close to the fixing nip portion N. In particular, by supporting the rotation shaft 50*a* of the flag 51, the fixing film 91, and the pressure roller 92 on a common frame, the positional relationship between the contact portion 52 of the flag 51 and the fixing nip portion N can be more easily ensured, and the contact portion 52 can be easily brought close to the fixing nip portion N. Note that, even if the rotation shaft 50*a* is supported by the inlet guide 93 provided in the frame, the number of components increases due to the presence of the inlet guide 93, but the contact portion 52 can be easily brought close to the fixing nip portion N as compared with a case where the rotation shaft 50*a* is supported at a portion other than each component of the fixing device 9. As a result, even if the length of the sheet remaining in the fixing nip portion N is short, the residual sheet can be easily detected by the flag 51, and the detection accuracy of the sheet remaining in the fixing device 9 can be improved with the configuration capable of detecting the loop of the sheet.

In the above description, the sheet detection unit 50 includes two sensors S1 and S2, but the number of sensors to be arranged may be increased in order to improve the position detection accuracy of the flag. In addition, in the above description, a flag 51 provided with two flag portions (light shielding portions, the first flag portion 53 and the second flag portion 54) to be detected by the photo-interrupter is illustrated, but the flag 51 may be provided with one flag portion. That is, the sensors S1 and S2 may be shielded by one flag portion. In the above description, the residual sheet detection sensor S2 is used for detecting the residual sheet, but may be used as a second loop detection sensor that detects a loop state different from the state detected by the loop detection sensor S1.

Loop Control

Here, the loop control of detecting the loop state of the sheet using the above-described sheet detection unit 50 and controlling the sheet conveyance speed of the fixing device 9 will be described. When the loop detection sensor S1 does not detect a loop of the sheet at the time of conveying the sheet, the control unit 110 sets the conveyance speed of the sheet by the fixing film 91 and the pressure roller 92 to a first speed. On the other hand, when the loop detection sensor S1 detects the loop of the sheet, the control unit 110 sets the sheet conveyance speed by the fixing film 91 and the pressure roller 92 to a second speed faster than the first speed.

That is, in a state where the sheet is not looped, the control unit 110 slows the rotational speed of the fixing motor M that drives the pressure roller 92 to lower the speed of conveying the sheet by the fixing film 91 and the pressure roller 92 than the speed of conveying the sheet by the belt conveyance device 30. As a result, a loop is formed on the sheet conveyed by the belt conveyance device 30 and the fixing nip portion N. On the other hand, in a state where the sheet is looped, the control unit 110 increases the rotational speed of the fixing motor M that drives the pressure roller 92, so that the speed at which the sheet is conveyed by the fixing film 91 and the pressure roller 92 is faster than the speed at which the sheet is conveyed by the belt conveyance device 30. As a result, the conveyance speed of the sheet is secured without making the loop of the sheet too large.

Figure 5:
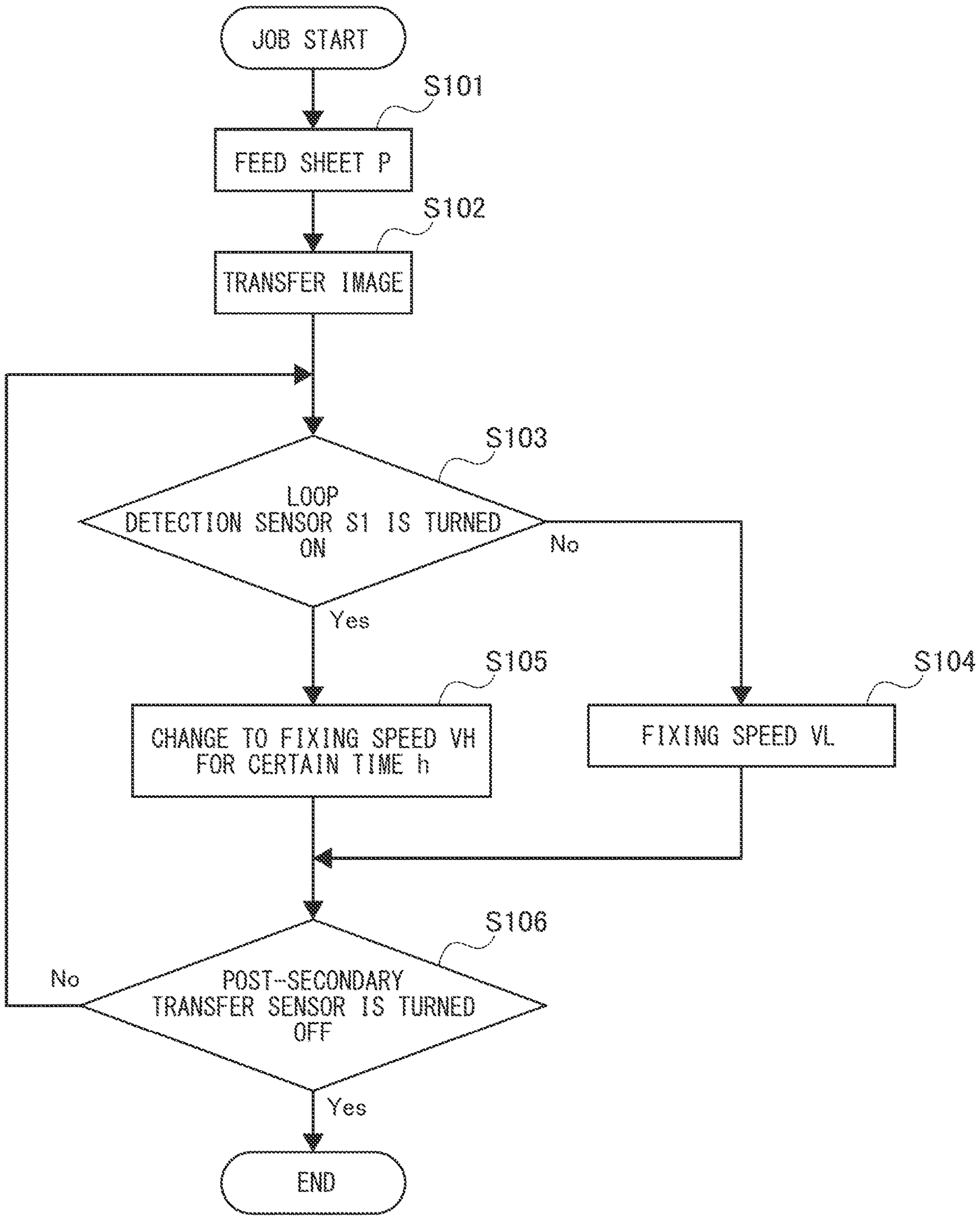
FIG. 5 is a flowchart of a loop detection operation of a sheet according to the first embodiment.

Such loop control of the present embodiment will be specifically described with reference to a flowchart of FIG. 5. First, when a job is started, the sheet P is fed from the cassette 10 and conveyed toward the registration roller 12 (S101). Next, an image is formed in each image forming unit in synchronization with feeding of the sheet, and the image is transferred to the sheet P conveyed from the registration roller 12 in the secondary transfer portion T2 (S102). The sheet P to which the image has been transferred is conveyed by the rotation of the secondary transfer portion T2 and the belt conveyance device 30, and reaches the fixing device 9.

At this time, the conveyance speed of the fixing device 9 (the sheet conveyance speed by the fixing film 91 and the pressure roller 92) is set to VL (first speed) which is 2% slower than the sheet conveyance speed in the secondary transfer portion T2. As a result, as the sheet P is conveyed, a loop of the sheet is formed between the belt conveyance device 30 and the fixing nip portion N of the fixing device 9.

Then, the control unit 110 determines whether or not a loop is formed on the sheet from the situation of the sheet detection unit 50 (S103). Specifically, it is determined whether the sheet P passes through the fixing nip portion N in a state where the output of the loop detection sensor S1 is off, that is, in a state where the sheet P does not form a loop, or whether the sheet P passes through the fixing nip portion N in a state where the sheet P forms a loop between the belt conveyance device 30 and the fixing nip portion N (the output of the loop detection sensor S1 is on).

When the sheet P passes through the fixing nip portion N without forming a loop (No in S103), the rotation of the fixing motor M is controlled to set the conveyance speed of the fixing device 9 to VL (first speed) (S104). That is, when the sheet conveyance speed of the fixing device is VL, this VL is maintained, and when the sheet conveyance speed of the fixing device is VH to be described below, the sheet conveyance speed of the fixing device is reduced from VH to VL.

On the other hand, in a case where a loop is formed on the sheet in S103 (Yes in S103), the rotation of the fixing motor M is controlled for a certain period of time h in order to set the conveyance speed of the fixing device 9 to VH (second speed) which is 2% faster than the sheet conveyance speed in the secondary transfer portion T2 (S105). That is, the sheet P is conveyed for the certain period of time h (0.5 seconds in the present embodiment) in a state where the sheet conveyance speed of the fixing device 9 is VH, and the loop of the sheet is eliminated. Thereafter, the control of S103 to S105 is repeated until the post-secondary transfer sensor 22 detects that the trailing edge of the sheet P has passed through the secondary transfer portion T2 (S106). Note that the loop detection sensor may determine that the sensor signal is in the loop state when the on state of the sensor signal continues for a certain period of time (for example, 0.1 seconds) in order to prevent erroneous detection.

Residual Sheet Detection Control

Next, residual sheet detection control of detecting a sheet remaining in the fixing nip portion N using the above-described sheet detection unit 50 and notifying an error will be described. In a case where the sheet detection unit 50 detects a sheet when the power of the apparatus is turned on, the control unit 110 outputs information indicating that a sheet remains in the fixing device 9. That is, in a case where the residual sheet detection sensor S2 is turned on when the power of the image forming apparatus 100 is turned on, the control unit 110 displays an error notification indicating that a sheet remains in the fixing device 9 on the operation panel S. Note that the control unit 110 may output the error notification to an external terminal such as a personal computer connected to the image forming apparatus 100. Further, even if the residual sheet detection sensor S2 is not turned on, when the loop detection sensor S1 is turned on, an error notification indicating that a sheet remains in the fixing device 9 may be displayed on the operation panel S.

Figure 6:
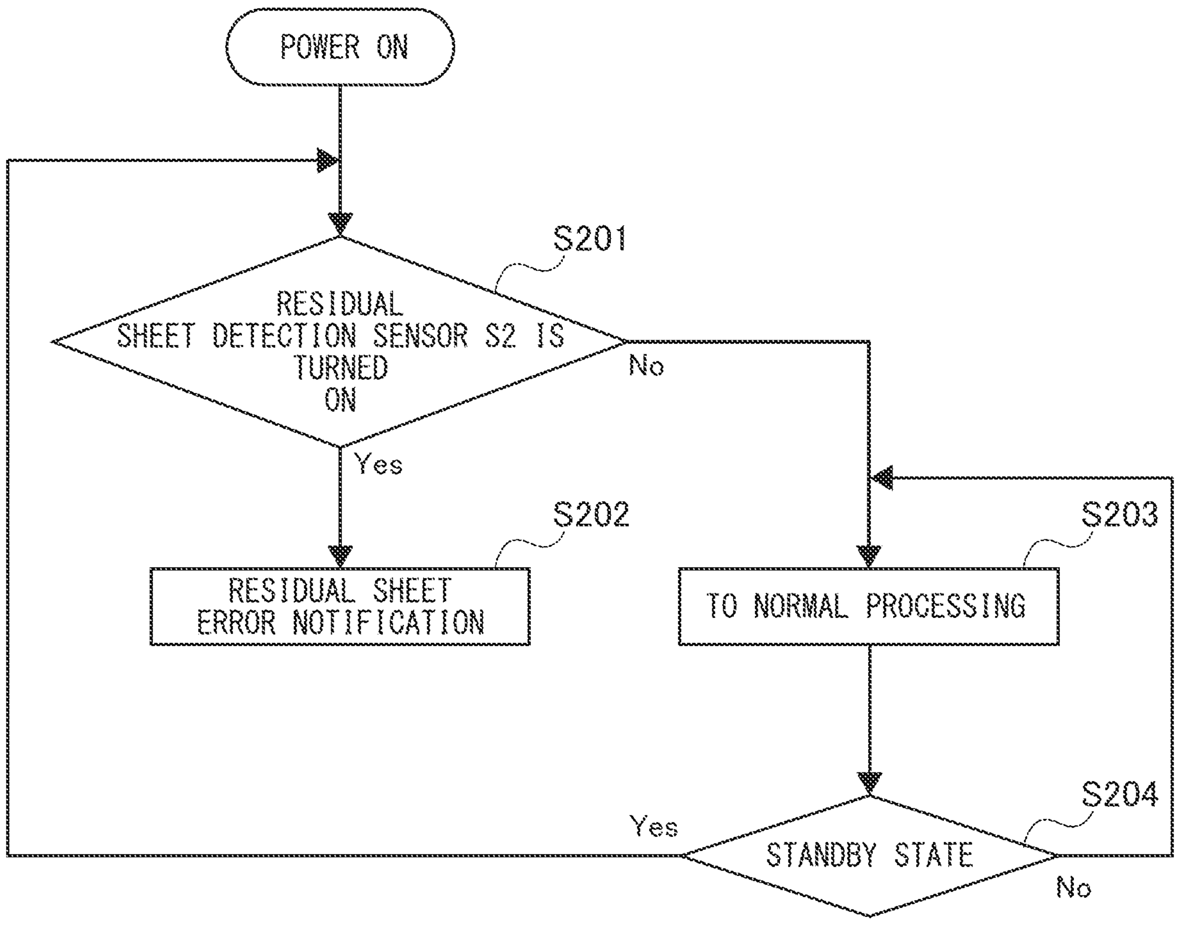
FIG. 6 is a flowchart of a residual detection operation of a sheet according to the first embodiment.

Such residual sheet detection control of the present embodiment will be specifically described with reference to a flowchart of FIG. 6. FIG. 6 is a flowchart for explaining a process of detecting remaining of a sheet P in a power-on state of the image forming apparatus 100 and in an idle state in which a print job is not executed. When the image forming apparatus 100 is powered on, the control unit 110 checks whether the residual sheet detection sensor S2 is turned on, that is, whether the sheet P is detected (S201). In the turn-on state (Yes in S201), the control unit 110 determines that there is a residual sheet in the fixing device 9, and notifies the user of an error indicating that there is a residual sheet (S202).

On the other hand, when the residual sheet detection sensor S2 does not detect the sheet P at the time of power-on in S201 (No in S201), the processing proceeds to normal initialization processing, image forming job reception, and image forming job execution processing (S203). Note that the image forming job is an operation from the start of image formation to the completion of image formation based on a print signal (image forming signal) for forming an image on a sheet. The initialization processing is processing of starting rotation of the photosensitive drum, sequentially raising various voltages, adjusting various voltages, and the like as a preparation operation before the image forming operation, and is so-called pre-rotation processing.

Next, the control unit 110 determines whether an image forming job not being executed is in a standby state (S204). If it is in the standby state (Yes in S204), the process proceeds to S201, and the control unit 110 determines whether to notify the user of the jam error by determining that there is a residual sheet similarly to when the power is turned on. When the process is not in the standby state in S204 (No in S204), the process returns to S203 to continue the normal processing. As a result, it is possible to determine whether the sheet P remains in a state where the sheet P is not conveyed.

In the present embodiment, with a configuration in which two contact portions are provided in one flag (moving member), loop detection and residual detection can be performed. As a result, the number of components can be reduced as compared with a configuration in which the loop detection and the residual detection are performed by independent flags (moving members).

Second Embodiment

A second embodiment will be described with reference to FIGS. 7 to 11. In the first embodiment described above, the configuration in which both the sheet on which the loop is formed and the sheet remaining in the fixing device 9 are detected by the distal end portion of the contact portion 52 of the flag 51 has been described. On the other hand, in the present embodiment, the sheet on which the loop is formed and the sheet remaining in the fixing device 9 are detected at two different places of a flag 51A.

Comparative Example

First, a comparative example illustrated in FIGS. 7 and 8 will be described. As described above, in the residual sheet detection, if the distal end portion of the contact portion 52 of the flag 51 is caught on the trailing edge of the sheet remaining in the fixing nip portion N, the residual sheet can be detected. Therefore, it is desirable that the distal end of the contact portion 52 is located near the fixing nip portion N.

Figure 7:
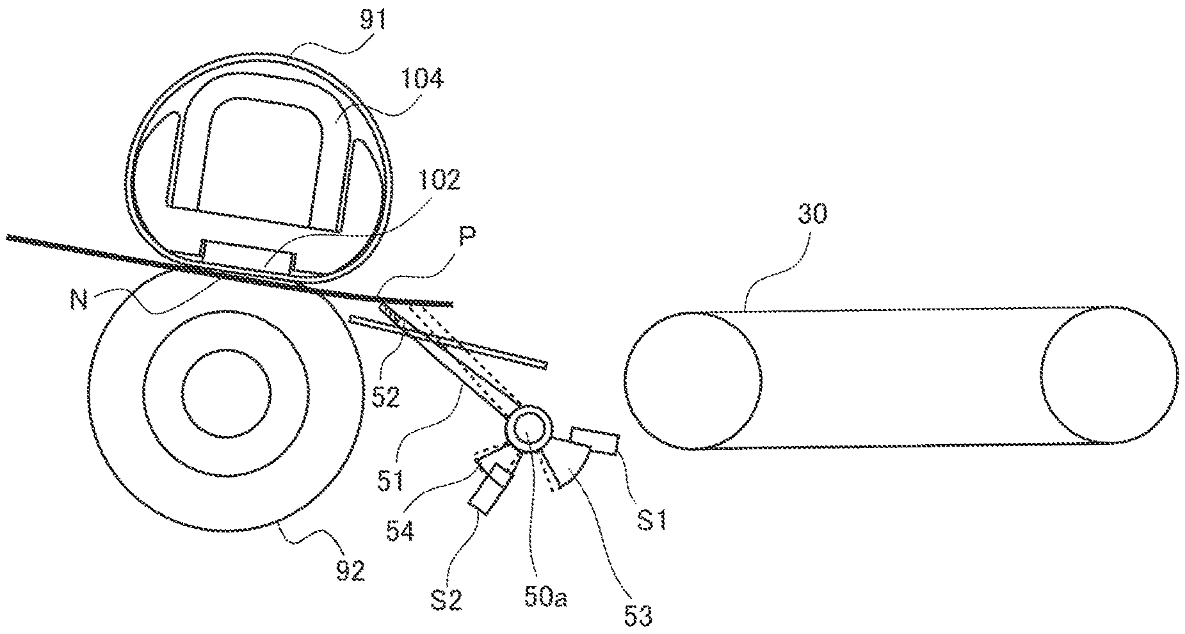
FIG. 7 is a diagram illustrating a residual detection state of a sheet according to a comparative example.
Figure 8:
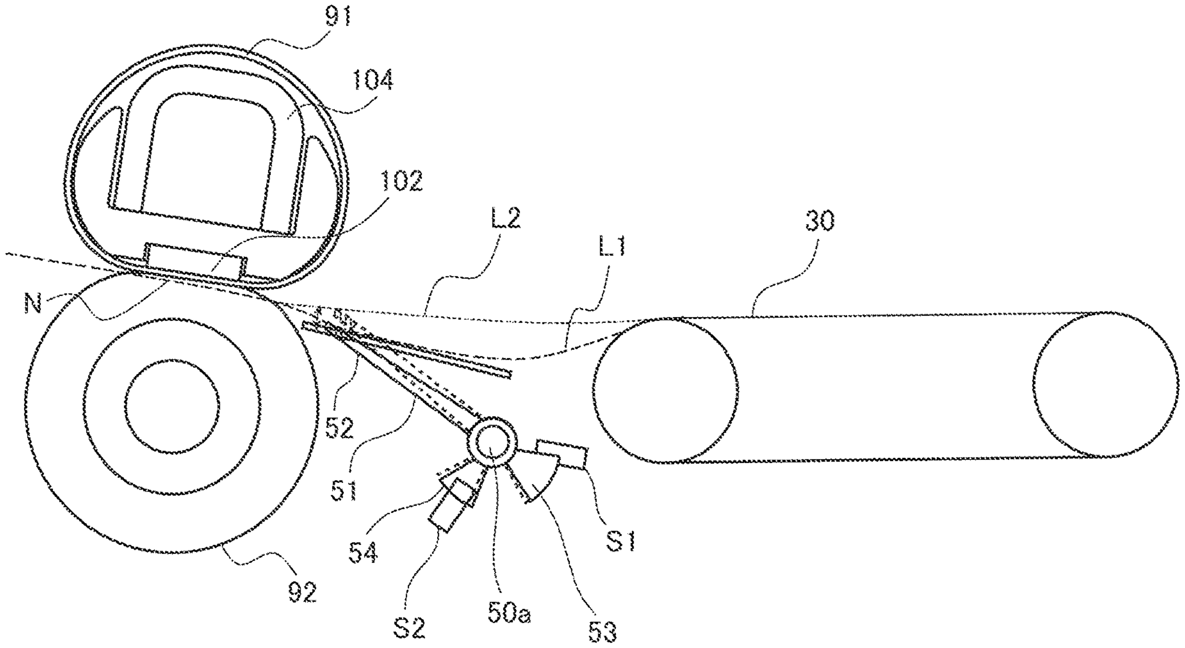
FIG. 8 is a diagram illustrating a loop detection state of a sheet according to the comparative example.

However, as illustrated in the comparative example of FIG. 7, when the distal end of the contact portion 52 is brought close to the fixing nip portion N by extending the flag 51 from the rotation shaft 50*a* to improve the detection performance of the residual sheet, the following problem may occur. That is, as illustrated in FIG. 8, when the distal end of the contact portion 52 is brought close to the fixing nip portion N, the loop determination is performed in a region where the difference in the loci between the state L1 in which the loop of the sheet occurs in the vicinity of the fixing nip portion N and the state L2 in which the loop is eliminated is small. For this reason, there is a possibility that it is difficult to discriminate between a minute behavior change and occurrence of a loop at the time of conveying the sheet P.

Configuration of Present Embodiment

Therefore, in the present embodiment, as illustrated in FIGS. 9A to 10B, the distal end portion of the flag 51A of the sheet detection unit 50A is bent, and a bent portion 52*b* is selectively used as the loop detection position and a distal end portion 52*a* is selectively used as the residual sheet detection position, thereby achieving both the loop detection performance and the residual sheet detection performance. That is, in the sheet detection unit 50A of the present embodiment, the shape of the flag 51A is different from that of the first embodiment. The sheet detection unit 50A is similar to the first embodiment in that the sheet detection unit includes a first flag portion 53, a second flag portion 54, and a detection unit 500 (a loop detection sensor S1 and a residual sheet detection sensor S2). The flag 51A of the present embodiment has a bent portion 52*b* bent such that the distal end portion 52*a* is bent in a direction extending from the rotation shaft 50*a* serving as a swing center. The bent portion 52*b* is a first contact portion for detecting that a loop is formed, and the distal end portion 52*a* is a second contact portion for detecting that a sheet remains in the fixing device 9.

In the flag 51A, the bent portion 52*b* is arranged such that the bent portion 52*b* is closest to the conveyance path at a position where the loop detection sensor S1 is switched on by the first flag portion (light shielding portion) 53 provided in the flag 51A, that is, at a position where the loop is detected. That is, when the flag 51A is located at the position where the loop is detected (third position, position in contact with sheet P in L1 state in FIG. 9A, position indicated by solid line), the bent portion 52*b* is located closer to the path along which the sheet is conveyed than the distal end portion 52*a*. As a result, the sheet can be detected by the bent portion 52*b* at the time of detecting the loop, and the sheet can be detected by the distal end portion 52*a* at the time of detecting the residual sheet (in a state of being in contact with the sheet P remaining in the fixing nip portion N in FIG. 10B). As a result, even if the distal end portion of the flag 51A is brought close to the fixing nip portion N to increase the residual sheet detection performance, it is possible to suppress deterioration of the loop detection performance. Hereinafter, a specific description will be given.

Loop Detection Operation and Residual Sheet Detection Operation

Next, a loop detection operation and a residual sheet detection operation performed using the sheet detection unit 50A of the present embodiment will be described with reference to FIGS. 9A to 10B.

When the sheet P passes on the inlet guide 93, the flag 51A of the sheet detection unit 50A is pressed by the sheet P and rotates about the rotation shaft 50*a*. The flag 51A is provided with a rotational force in a direction opposite to the pressing by the sheet P (clockwise direction in FIGS. 9A, 9B, 10A, and 10B) by a turning spring (not illustrated).

The distal end portion 52*a* of the flag 51A pressed by the sheet P is disposed so as to be rotatable between the state L1 (see FIG. 9A) in which a loop is generated due to a difference between a conveyance speed of the sheet P conveyed by the intermediate transfer belt 20 and the belt conveyance device 30 and a conveyance speed of the sheet P conveyed by the fixing device 9 and the state L2 (see FIG. 9B) in which the loop is eliminated. The belt conveyance device 30 is designed to convey a sheet at substantially the same speed as a sheet conveyance speed in the secondary transfer portion T2. Similarly, a sheet conveyance speed in the fixing device 9 is designed to convey the sheet at substantially the same speed. However, the fixing device 9 rotates the fixing film 91 by rotationally driving the pressure roller 92. As the fixing film 91 rotates following the rotational drive of the pressure roller 92, a slight slip occurs between the pressure roller 92 and the fixing film 91. As a result, an error occurs in the rotational speed of the fixing film 91. The same applies to the belt conveyance device 30. Therefore, there is a possibility that the sheet conveyance speed in the fixing device 9 and the sheet conveyance speed in the secondary transfer portion T2 are different.

In a case where the secondary transfer portion T2 and the fixing nip portion N nip and convey the sheet at the same time and the sheet conveyance speed in the fixing device 9 becomes faster than the sheet conveyance speed in the secondary transfer portion T2, there is a possibility that the fixing device 9 pulls the sheet and the image is not transferred to a desired region on the sheet (transfer deviation). In order to suppress the transfer deviation, the loop detection sensor detects the loop amount of the sheet and controls the sheet conveyance speed in the fixing device. Details thereof will be described below.

Figure 9A:
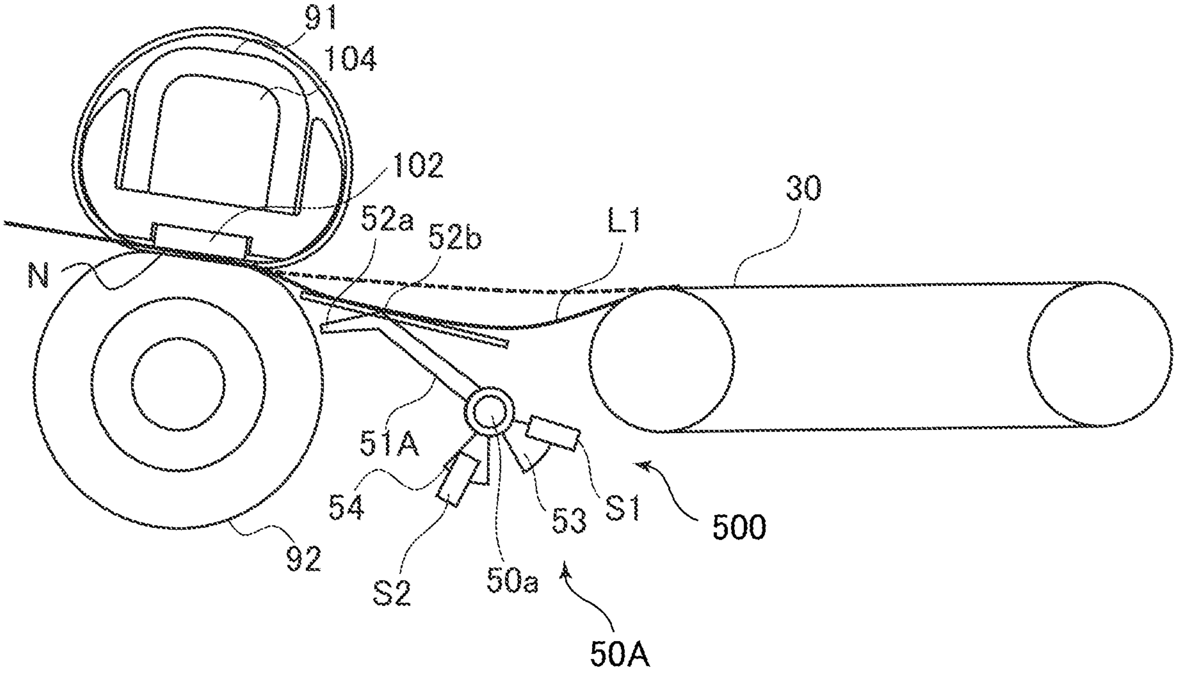
FIG. 9A is a diagram for explaining a state in which a sheet is looped according to a second embodiment.

In the loop detection sensor S1, the loop detection sensor S1 is turned on when light of the loop detection sensor S1 is shielded, and the loop detection sensor S1 is turned off when light of the loop detection sensor S1 is transmitted. Therefore, as illustrated in FIG. 9A, when the bent portion 52*b* of the flag 51A reaches the position of the state L1 where the loop has occurred, the position of the first flag portion 53 is defined such that the first flag portion 53 turns on the loop detection sensor S1.

Figure 9B:
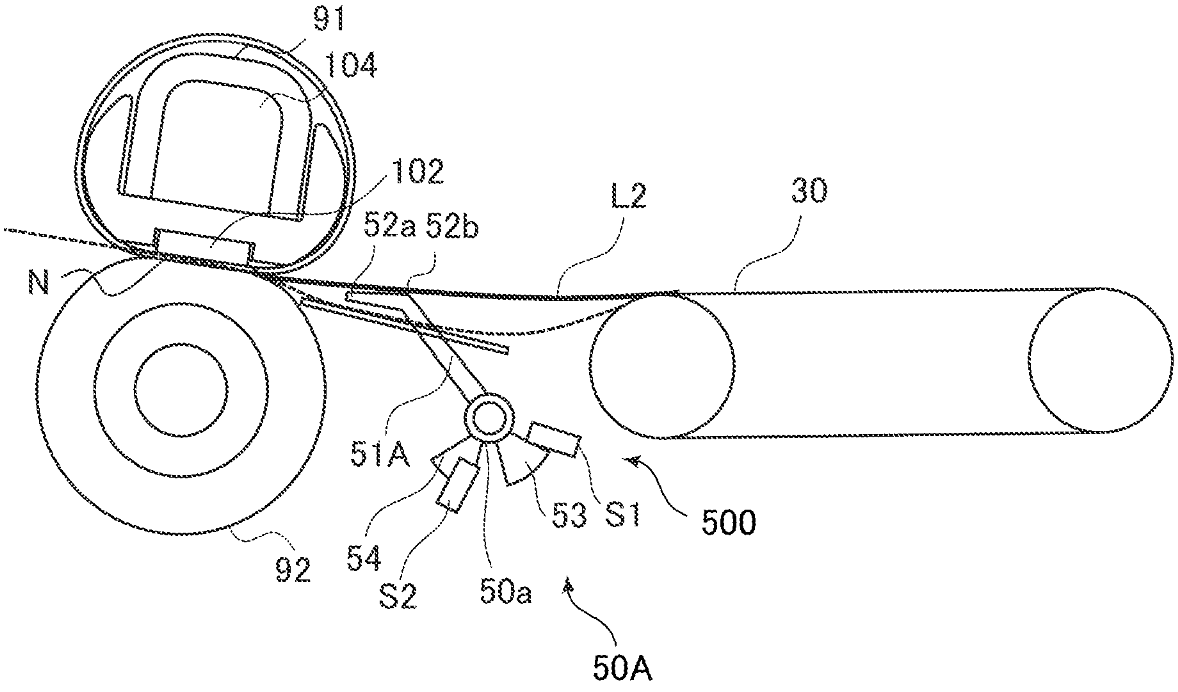
FIG. 9B is a diagram for explaining a state in which the loop of the sheet is eliminated according to the second embodiment.

Next, as illustrated in the state L2 of FIG. 9B, when the loop of the sheet is eliminated, the first flag portion 53 transmits the light of the loop detection sensor S1, and the loop detection sensor S1 is turned off. Then, the sheet conveyance speed of the fixing device 9 is reduced, and the loop is formed again.

Figure 10A:
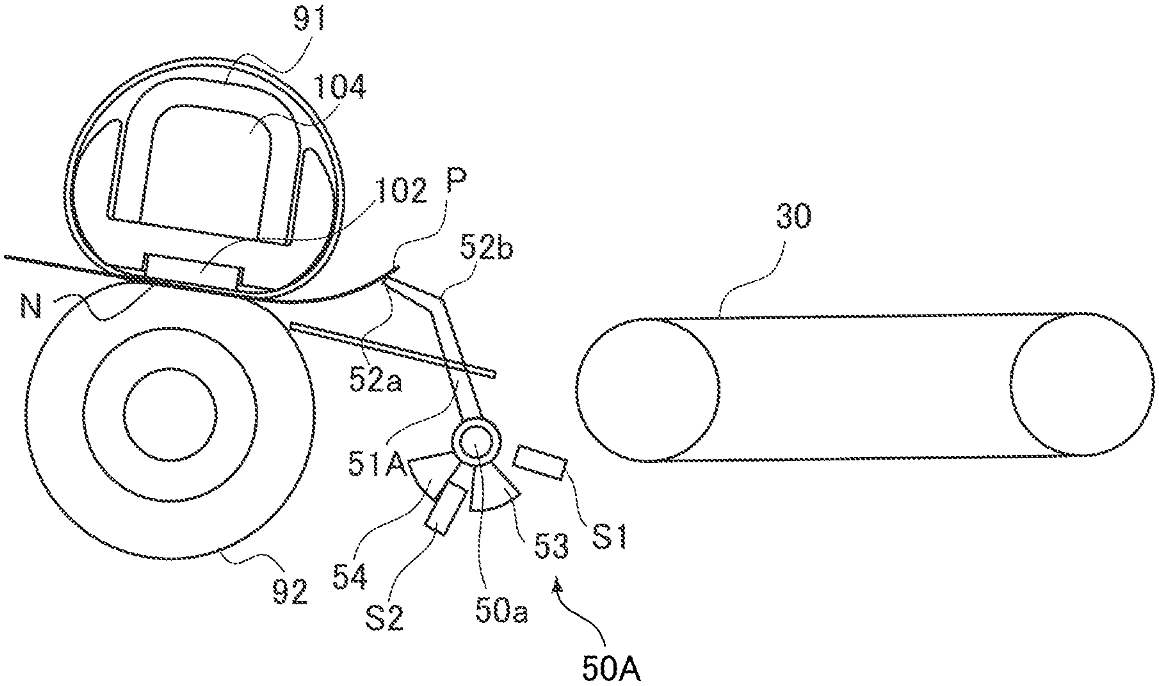
FIG. 10A is a diagram for explaining a state in which a residual sheet detection flag is in contact with a trailing edge of a residual sheet according to the second embodiment.

Next, as illustrated in FIG. 10A, when the sheet P remains in the fixing nip portion N at the time of a jam or the like, the trailing edge of the sheet P is detected by the distal end portion 52*a* of the flag 51A. In the present embodiment, even when a small-sized sheet such as a postcard or an envelope having a length of about 150 mm in the sheet conveyance direction remains in the fixing nip portion N, the distal end portion 52*a* of the flag 51A is extended to the vicinity of the inlet of the fixing nip portion N so that the residual sheet can be detected.

Figure 10B:
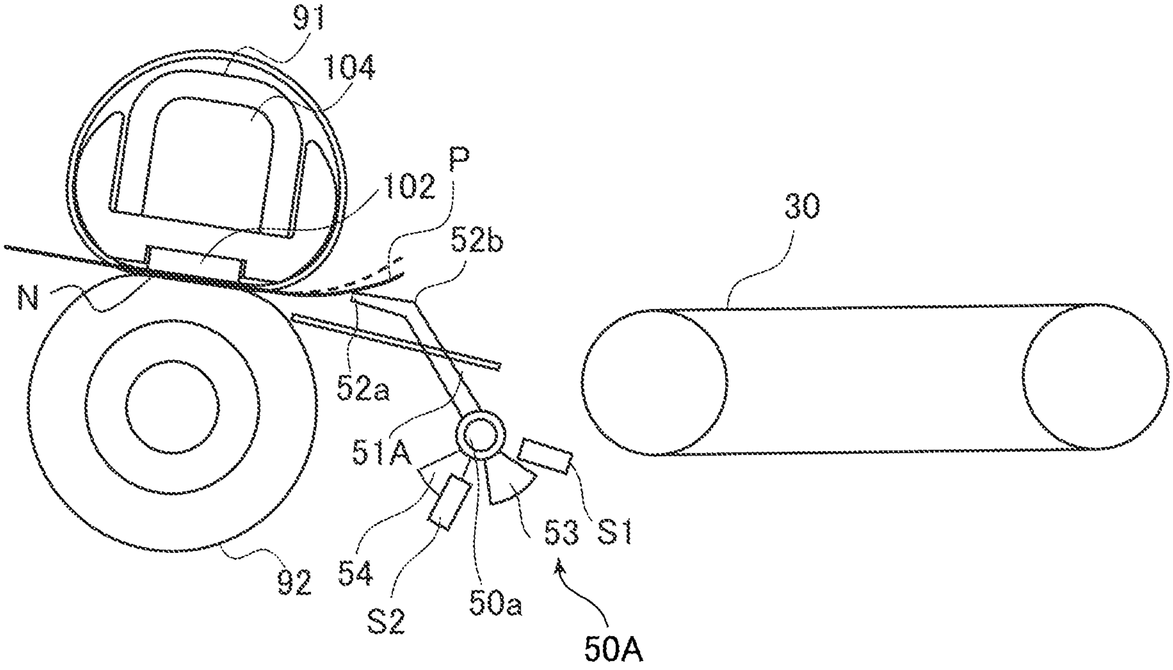
FIG. 10B is a diagram for explaining a state in which a residual sheet is detected by a residual sheet detection unit according to the second embodiment.

Next, as illustrated in FIG. 10B, when the sheet P remains in the fixing nip portion N due to occurrence of a jam or the like, the sheet P follows the direction of the nip surface of the fixing nip portion N, so that the trailing edge of the sheet P is lowered from the broken line position to the solid line position. Then, the distal end portion 52*a* in contact with the trailing edge of the sheet P rotates counterclockwise, and the second flag portion 54 shields the light of the residual sheet detection sensor S2. Even in this state, the first flag portion 53 does not shield the light of the loop detection sensor S1. Since the second flag portion 54 shields the light of the residual sheet detection sensor S2, the residual sheet detection sensor S2 is turned on, and it is detected that the sheet P remains in the fixing nip portion N.

In the above description, the loop detection position and the residual sheet detection position are provided by providing the bent portion 52*b* in the flag 51A. However, a loop detection unit (first contact portion) and a residual sheet detection unit (second contact portion) may be provided in the flag by using a configuration in which a convex portion is provided in the middle of the flag instead of the bent portion 52*b* or a configuration in which the flag is bifurcated.

Figure 11:
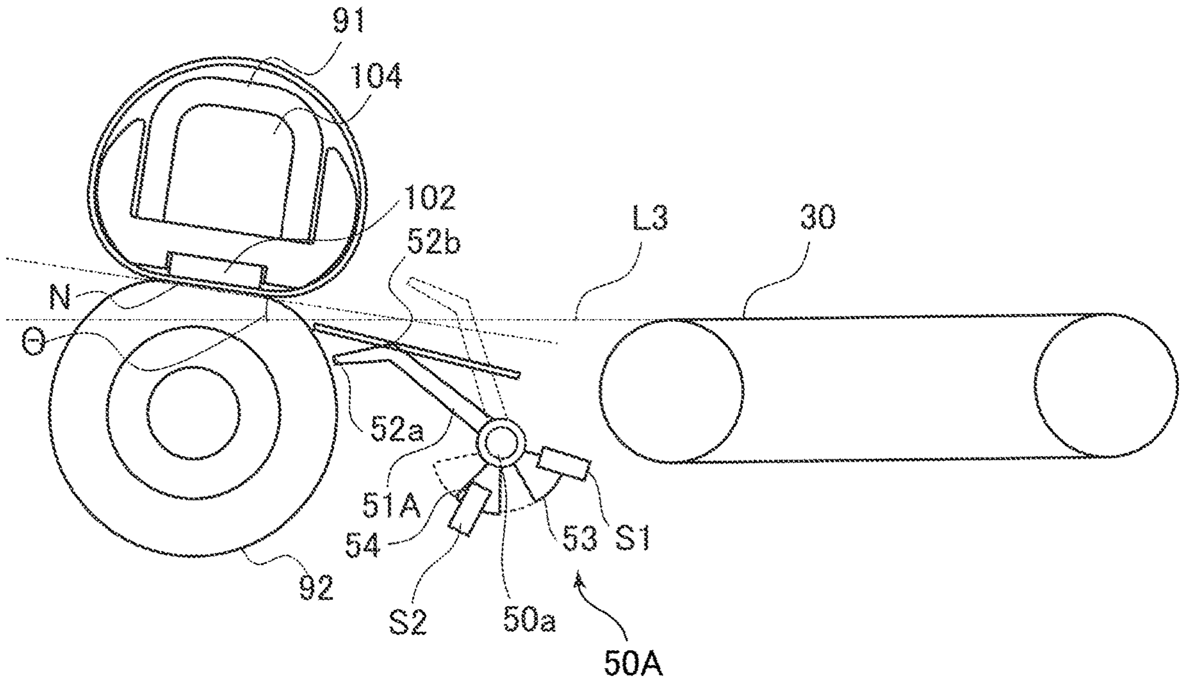
FIG. 11 is a diagram illustrating a relationship between a conveyance locus of a sheet and a nip portion according to a second embodiment.

As illustrated in FIG. 11, the fixing nip portion N is preferably disposed with an inclination θ with respect to an imaginary line L3 is a line extended which is extended a sheet conveyance locus of the belt conveyance device 30 disposed on the upstream of the fixing device 9 such that the downstream of the fixing nip portion N is away from the flag 51A. That is, when the conveyance locus of the sheet conveyed by the belt conveyance device 30 is extended, the direction of conveying the sheet in the fixing nip portion N is preferably inclined with respect to the imaginary line L3 such that the outlet of the fixing nip portion N is separated from the imaginary line L3 than the inlet of the fixing nip portion N. As a result, since the sheet remaining in the fixing nip portion N is held in the fixing nip portion N so as to tilt the flag 51A downward, the flag 51A facilitates detection of the residual sheet. Note that 0 is desirably set in a range of 0 to 40 degrees.

Other Embodiments

In the above-described embodiments, the moving member detected by the loop detection sensor S1 and the residual sheet detection sensor S2 is the flag 51 serving as the swing member, but the moving member may slide by coming into contact with the sheet instead of swinging. For example, the moving member is arranged so as to be movable in the vertical direction in FIGS. 3 and 4, and the loop detection sensor S1 and the residual sheet detection sensor S2 are arranged vertically. At this time, if the loop detection sensor S1 is disposed below the residual sheet detection sensor S2, both the loop detection and the residual sheet detection can be performed by one moving member as in the case illustrated in FIGS. 3 and 4.

In addition, in the above-described embodiment, the intermediate transfer method of transferring a toner image from the intermediate transfer belt 20 serving as an image bearing member to a sheet has been described, but the present invention is also applicable to a direct transfer method of directly transferring a toner image from a photosensitive drum to a sheet. In this case, the photosensitive drum corresponds to the image bearing member.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-184628, filed Nov. 12, 2021, which is hereby incorporated by reference herein in its entirety.

What is claimed is:

1. An image forming apparatus comprising:

a transfer portion configured to transfer a toner image onto a recording material;

a first rotary member that is rotatable and includes a heat source;

a second rotary member configured to form a nip portion by being in contact with an outer peripheral surface of the first rotary member, the second rotary member being configured to fix the toner image by applying heat and pressure while nipping and conveying the recording material together with the first rotary member;

a contact member, including a contact portion that is contactable with the recording material, disposed downstream of the transfer portion and upstream of the nip portion in a conveyance direction of the recording material, the contact member being configured to be movable among:

a first position where the contact portion is in a conveyance path of the recording material;

a second position where the contact portion retracts from the first position by coming into contact with the recording material as the recording material passes through the conveyance path; and a third position where the contact portion retracts from the first position further than the second position, in a state where the contact portion receive pressure from the recording material being conveyed through the conveyance path while the contact member is at the second position;

a first sensor configured to detect whether or not the contact member is in the second position;

a second sensor configured to detect whether or not the contact member is in the third position; and a control unit configured to control a rotational speed of the second rotary member during an image formation based on a detection result of the second sensor.

2. The image forming apparatus according to claim 1, wherein the second sensor detects that the contact member is located at the third position in a state where the recording material forms a loop during image formation.

3. The image forming apparatus according to claim 1, further comprising:

a fixing device including the first rotary member and the second rotary member, wherein the contact member, the first sensor, and the third sensor are detachable integrally with the fixing device with respect to a main body of the image forming apparatus.

4. The image forming apparatus according to claim 1, further comprising:

an inlet guide configured to guide the recording material conveyed from the transfer portion to an inlet of the nip portion, wherein the contact member is provided in the inlet guide.

5. The image forming apparatus according to claim 1, wherein:

the contact member includes a distal end portion and a swing center, the contact member being swingable about the swing center, and the distal end portion is positioned closer to the nip portion than the swing center.

6. The image forming apparatus according to claim 5, wherein the contact member includes:

a first contact portion that contacts the recording material in a state where the contact member is at the third position, which is where the recording material develops a loop; and a second contact portion that contacts the recording material in a state where the recording material remains in the nip portion.

7. The image forming apparatus according to claim 6, wherein, in a state where the contact member is located at the first position, the second contact portion is closer to the nip portion than the first contact portion.

8. The image forming apparatus according to claim 7, wherein:

the contact member includes a bent portion, the distal end portion is disposed at a distal end of the bent portion, the bent portion is the first contact portion, and the distal end portion is the second contact portion.

9. The image forming apparatus according to claim 1, further comprising:

a conveyance unit configured to convey the recording material between the transfer portion and the nip portion, wherein a conveying direction of the recording material in the nip portion is inclined with respect to an imaginary line so that an outlet of the nip portion is farther from the imaginary line than an inlet of the nip portion, the imaginary line extending a conveyance locus of the recording material being conveyed by the conveyance unit.

10. The image forming apparatus according to claim 1, wherein during conveyance of the recording material, the control unit sets the rotational speed of the second rotary member to a first speed in a state where the second sensor does not detect that the contact member is in the third position, and sets the rotational speed of the second rotary member to a second speed higher than the first speed in a state where the second sensor detects that the contact member is at the third position.

11. The image forming apparatus according to claim 1, wherein the contact member is biased to receive a rotational force in a direction opposite to a force applied by the recording material.

12. The image forming apparatus according to claim 4, wherein the contact member is configured to intersect the inlet guide.

13. The image forming apparatus according to claim 5, wherein the distal end portion is disposed above the nip portion in a direction orthogonal to the conveyance direction in a state where the contact member is disposed at the first position.

* * * * *